United States Patent
Hornstein et al.

(10) Patent No.: US 12,330,519 B2
(45) Date of Patent: Jun. 17, 2025

(54) SYSTEM AND METHOD FOR CHARGING AN ELECTRIC VEHICLE FROM ANOTHER ELECTRIC VEHICLE

(71) Applicant: GM GLOBAL TECHNOLOGY OPERATIONS LLC, Detroit, MI (US)

(72) Inventors: Sharon Hornstein, Pardes Hanna (IL); Klaus Trangbaek, Ein Vered (IL)

(73) Assignee: GM Global Technology Operations LLC, Detroit, MI (US)

( * ) Notice: Subject to any disclaimer, the term of this patent is extended or adjusted under 35 U.S.C. 154(b) by 704 days.

(21) Appl. No.: 17/725,438

(22) Filed: Apr. 20, 2022

(65) Prior Publication Data
US 2023/0339342 A1  Oct. 26, 2023

(51) Int. Cl.
| H02J 7/00 | (2006.01) |
| B60L 53/18 | (2019.01) |
| B60L 53/57 | (2019.01) |
| B60L 53/65 | (2019.01) |
| B60L 53/66 | (2019.01) |
| H02J 7/34 | (2006.01) |

(52) U.S. Cl.
CPC ............... B60L 53/18 (2019.02); B60L 53/57 (2019.02); B60L 53/65 (2019.02); B60L 53/66 (2019.02); *H02J 7/342* (2020.01)

(58) Field of Classification Search
USPC .................................................. 320/104, 105
See application file for complete search history.

(56) References Cited

U.S. PATENT DOCUMENTS

| 2015/0251550 A1* | 9/2015 | Stegmueller ............ B60L 53/20 320/105 |
| 2016/0052404 A1* | 2/2016 | Enomoto ............... B60L 53/305 320/108 |
| 2020/0067334 A1* | 2/2020 | Fan ........................ B60L 53/32 |
| 2020/0072621 A1* | 3/2020 | Lee ..................... G01C 21/3889 |
| 2020/0231045 A1* | 7/2020 | Shin .................... B60L 15/2045 |

* cited by examiner

*Primary Examiner* — Samuel Berhanu
(74) *Attorney, Agent, or Firm* — Quinn IP Law (57) ABSTRACT

A system for a vehicle-to-vehicle charging service for plug-in electric vehicles (PEVs) includes a real-time server (RTS). The RTS wirelessly communicates with communication devices associated with individual PEVs having membership in the charging service and provides to the communication devices real-time positions of individual PEVs on a map of a terrain. The system also includes a first communication device for a first PEV configured to wirelessly transmit, via the RTS, to communication devices associated with the remaining PEVs, a request for an amount of electrical energy to charge the first PEV. The system additionally includes a second communication device associated with a second PEV and configured to wirelessly transmit, via the RTS, to the first communication device an offer to dispense the requested amount of electrical energy. The first communication device is further configured to wirelessly transmit, via the RTS, to the second communication device acceptance of the offer.

20 Claims, 5 Drawing Sheets

SYSTEM AND METHOD FOR CHARGING AN ELECTRIC VEHICLE FROM ANOTHER ELECTRIC VEHICLE

INTRODUCTION

The present disclosure relates to a system and a method for charging one electric vehicle from another electric vehicle.

An electric vehicle, also called an EV, uses one or more electric or traction motors for propulsion. An electric vehicle may be powered through a collector system by electricity from off-vehicle sources, or may be self-contained with a battery, solar panels, or an electric generator to convert fuel to electricity.

A plug-in electric vehicle (PEV) is a motor vehicle that includes a rechargeable battery pack that may be recharged from an external source of electricity, such as a wall socket, while the electricity stored in the rechargeable battery pack drives or contributes to driving the wheels. PEV is a subcategory of electric vehicles that includes all-electric or battery electric vehicles (BEVs), plug-in hybrid vehicles (PHEVs), and electric vehicle conversions of hybrid electric vehicles and internal combustion engine vehicles, A hybrid electric vehicle (HEV) combines a conventional (usually fossil fuel-powered) powertrain with some form of electric propulsion.

PEVs may charge from industrial or residential power outlets, such as overnight at a PEV user's residence, a process intended to give a sufficient charge for normal everyday usage. A PEV may also be charged from a dedicated charging station, such as while the PEV's user is at work, and be left to charge throughout the day, extending possible range of a commute and eliminating range anxiety.

SUMMARY

A system for a vehicle-to-vehicle (V2V) charging service for plug-in electric vehicles (PEVs) includes a real-time server (RTS). The RTS is configured to wirelessly communicate with a plurality of communication devices associated with individual PEVs having membership in the V2V charging service. The RTS is also configured to provide to the plurality of communication devices real-time positions of at least some of the individual PEVs on a map of a terrain. The system also includes a first communication device associated with a first PEV from the individual PEVs. The first communication device is configured to wirelessly transmit, via the RTS, to at least one of the communication devices associated with the remaining individual PEVs, a request for an amount of electrical energy to charge the first PEV. The system additionally includes a second communication device associated with a second PEV from the individual PEVs and configured to wirelessly transmit, via the RTS, to the first communication device an offer to dispense from the second PEV to the first PEV the amount of electrical energy requested by the first communication device. The first communication device is further configured to wirelessly transmit, via the RTS, to the second communication device an acceptance of the offer to dispense the requested amount of electrical energy and affect or implement the charging service.

The second communication device may be additionally configured to wirelessly transmit, via the RTS, to the first communication device a proposed location on the map to implement the charging service.

The first communication device may be further configured to wirelessly transmit, via the RTS, to the second communication device an acceptance of the proposed location on the map to implement the charging service.

The RTS may be additionally configured to wirelessly communicate to each of the first and second communication devices charge parameters, such as number of kW-hours, time to implement the charging service, price per kWh of the charging service, etc., to implement the charging service. Each of the first and second communication devices may also wirelessly transmit to each other, via the RTS, a respective acceptance of the charge parameters.

At least one of the first communication device and the second communication device may be further configured to wirelessly transmit, via the RTS, an inquiry to the other of the first communication device and the second communication device, whether the respective first PEV or second PEV is in possession of a charging cable assembly for electrically connecting the first PEV to the second PEV to charge the first PEV from the second PEV.

The RTS may also be configured to wirelessly enable a user of the first PEV or the user of the second PEV to commence the charging service.

The RTS may be additionally configured to wirelessly enable a user of the first PEV or a user of the second PEV to terminate the charging service.

The RTS may be further configured to wirelessly communicate to each of the first and second communication devices when the charging service has been completed.

The RTS may be additionally configured to enable a user of the first PEV to transfer payment for the charging service to a user of the second PEV.

The RTS may be further configured to update positions of each individual PEV on the map of the terrain.

A method of providing a V2V charging service for PEVs is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
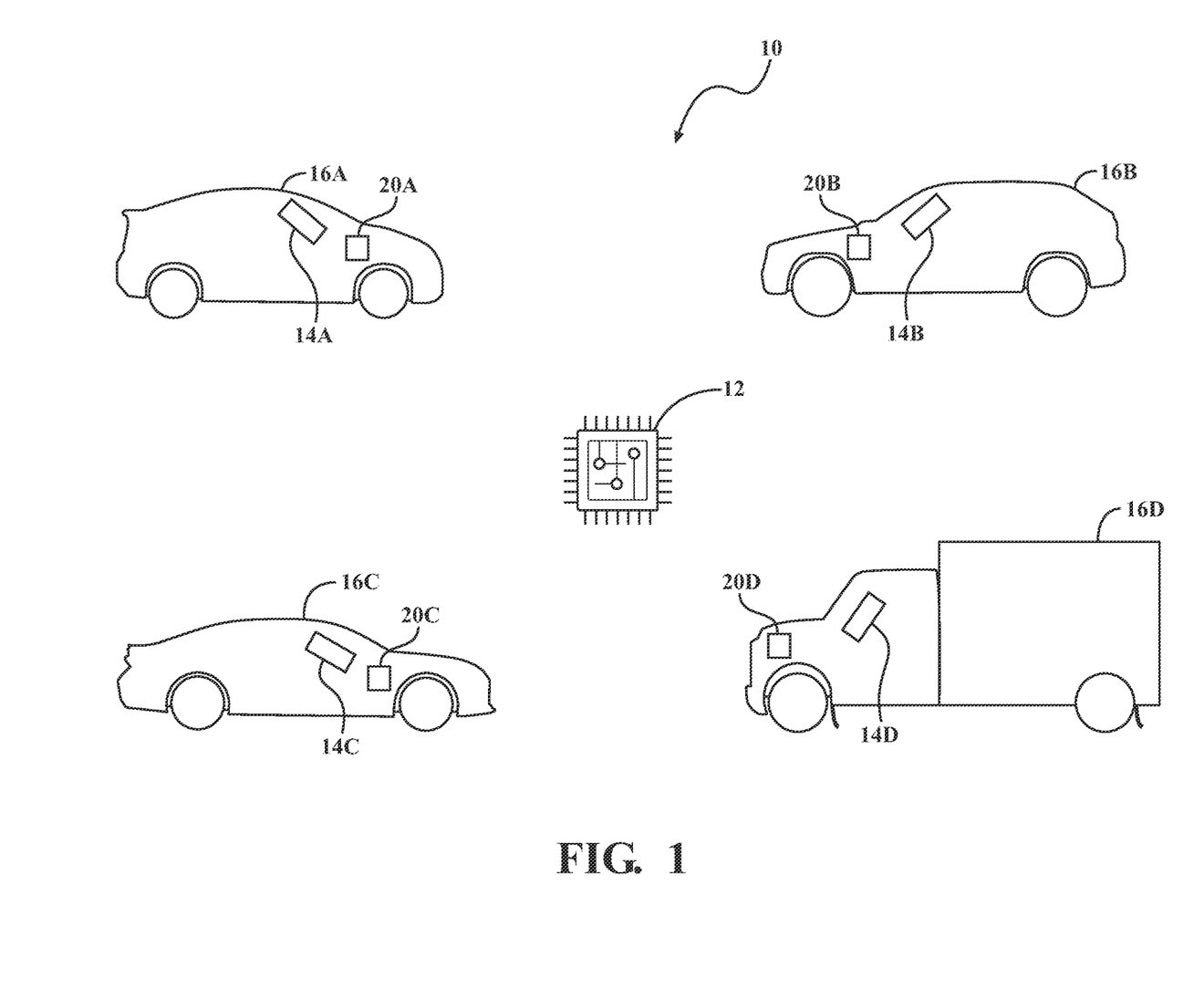
FIG. 1 is a schematic illustration of a system for a vehicle-to-vehicle (V2V) charging service having a real-time server (RTS) configured to wirelessly communicate with a plurality of communication devices associated with individual plug-in electric vehicles (PEVs) having membership in the V2V charging service, including first and second PEVs, according to the disclosure.
Figure 2:
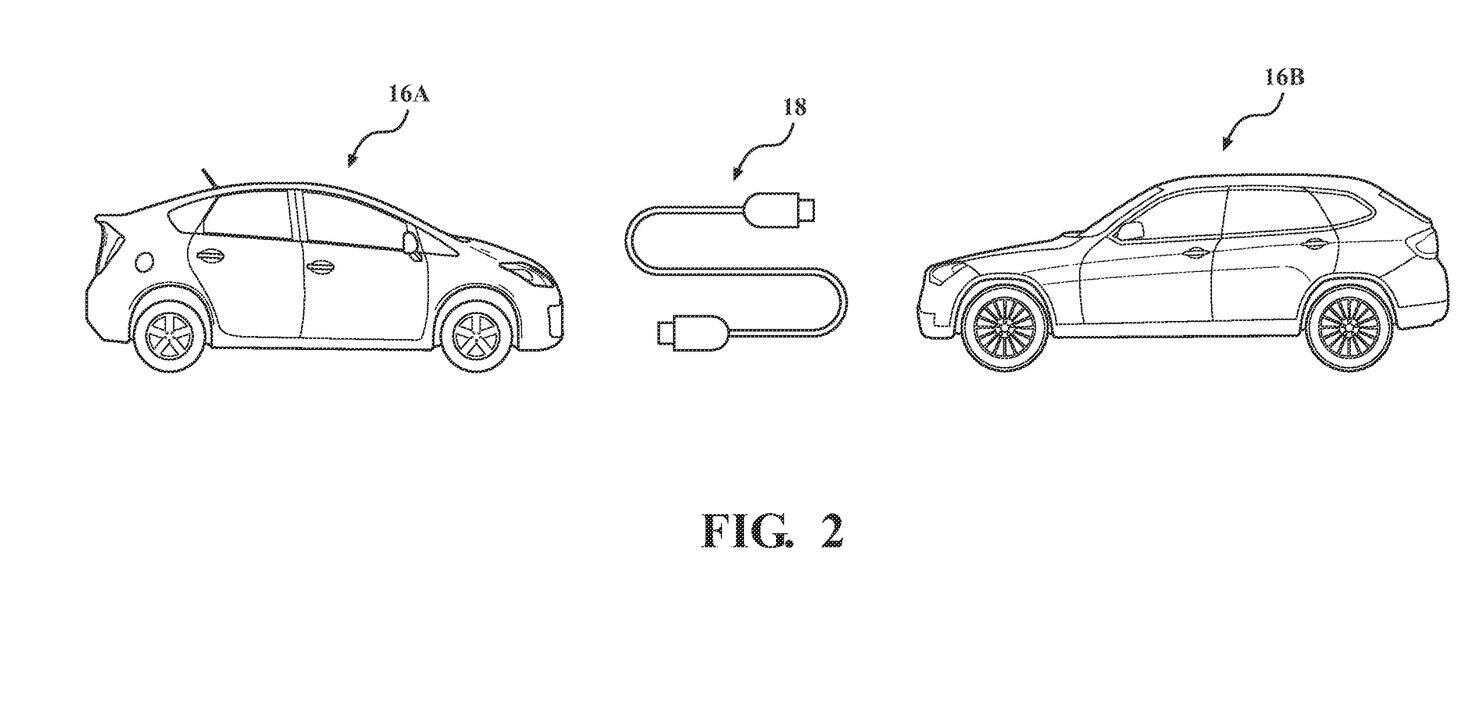
FIG. 2 is a schematic side view of the first PEV and the second PEV (shown in FIG. 1) being electrically connected via a charging cable assembly to implement the charging service, according to the disclosure.

Referring to FIG. 1, a schematically illustrated system 10 configured to facilitate a vehicle-to-vehicle (V2V) charging service for plug-in electric vehicles (PEVs) includes a real-time server (RTS) 12. As will be described in detail below, the RTS 12 is configured to wirelessly communicate with a plurality of communication devices 14A-14D associated with individual PEVs 16A-16D, each having a membership in the V2V charging service. The RTS 12 is thereby configured to facilitate charging of one PEV from another PEV, each from the PEVs 16A-16D. As, for example, shown in FIG. 2, such charging may be implemented using a dedicated charging cable assembly 18 configured to electrically connect first PEV 16A to second PEV 16B.

In general, each PEV 16A-16D generally includes a powertrain having a respective power-source configured to generate respective power-source torque for propulsion of the corresponding PEV. Each power-source of PEV 16A-16D may include a respective electric motor-generator or traction motor, as well as additional or auxiliary power-source, such as an internal combustion engine, to act in concert with the respective power-sources to power the corresponding PEV. Each PEV 16A-16D also includes a PEV electrical system having a respective battery module with one or more rechargeable energy storage cells or batteries configured to supply electrical energy to the corresponding PEV power-source. Each electrical system of the PEV 16A-16D is also connected to a corresponding programmable electronic controller 20A-20D (shown in FIG. 1). The individual electronic controllers 20A-20D may be configured i.e., programmed, to control the respective powertrains, electrical systems, and various other vehicle systems, such as lighting, infotainment, and heating ventilation and air conditioning (HVAC) of the PEV 16A-16D.

Each electronic controller 20A-20D may be configured as a vehicle body controller or a central processing unit (CPU) programmed to regulate various systems and functions of the corresponding PEVs 16A-16D. Additionally, each electronic controller 20A-20D includes a respective processor and tangible, non-transitory memory, for example with instructions for operation of the corresponding powertrains and the electrical systems programmed therein. The memory may be an appropriate recordable medium that participates in providing computer-readable data or process instructions. Such a recordable medium may take many forms, including but not limited to non-volatile media and volatile media. Non-volatile media for the respective electronic controllers 20A-20D may include, for example, optical or magnetic disks and other persistent memory. Volatile media may include, for example, dynamic random-access memory (DRAM), which may constitute a main memory.

Operating instructions may be transmitted by one or more transmission mediums, including coaxial cables, copper wire and fiber optics, including wires of a system BUS coupled to a processor of the corresponding electronic controller 20A-20D, or via a wireless connection. Memory of each electronic controller 20A-20D may also include a flexible disk, hard disk, magnetic tape, another magnetic medium, a CD-ROM, DVD, another optical medium, etc. The electronic controllers 20A-20D may be configured or equipped with other required computer hardware, such as a high-speed clock, requisite Analog-to-Digital (A/D) and/or Digital-to-Analog (D/A) circuitry, input/output circuitry and devices (I/O), as well as appropriate signal conditioning and/or buffer circuitry. Algorithms required by each electronic controller 20A-20D or accessible thereby may be stored in the corresponding memory and automatically executed to provide the required functionality of the corresponding powertrain and the electrical system of the PEVs 16A-16D.

Specifically, the respective electronic controller 20A-20D may be programmed to command a specific rate of charge of corresponding PEV battery modules by setting a value of charging current flowing into the subject battery module. Generally, each PEV 16A-16D may include a respective charge port module (not shown) configured to accept a charging plug, for example connected to an external source of electricity, such as a charging station connected to an electrical charging grid. Accordingly, each PEV 16A-16D is configured to accept charging current under control of the corresponding electronic controller 20A-20D for recharging its respective battery module. Additionally, the respective battery module of each PEV 16A-16D may be configured to dispense charging current to an external electrical device under the control of its corresponding electronic controller 20A-20D.

Figure 3:
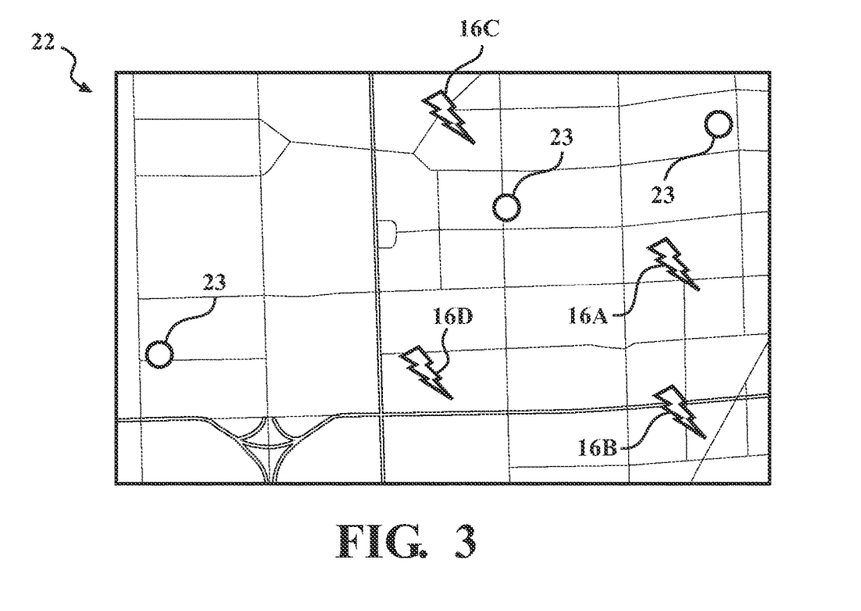
FIG. 3 is a schematic illustration of the system shown in FIG. 1, depicting a map of a terrain generated by the RTS showing real-time positions of PEVs having membership in the V2V charging service.

The communication devices 14A-14D shown in FIG. 1 are configured to be electronically connected to the respective electronic controllers 20A-20D. The communication devices 14A-14D are employed for exchanging information via the RTS 12 to arrange the V2V charging service. Each communication device 14A-14D may, for example, be a mobile device, such as a cellular telephone (shown in FIG. 4) or a laptop, or an infotainment system having a navigation device interface of the respective PEV 16A-16D running a mobile software application 21 (shown in FIG. 5) for communicating with the RTS 12. Each PEV 16A-16D may communicate to the RTS 12 its real-time position or location via the corresponding communication device 14A-14D using a global positioning satellite (GPS). Accordingly, the RTS 12 may be further configured to, either continuously or periodically, update positions of each individual PEV 16A-16D on a map 22 (shown in FIG. 3) of a specified geographical area or terrain, and, for example, remove an unavailable communication device. The RTS 12 is also configured to provide or communicate to the plurality of available communication devices 14A-14D real-time positions or locations of at least some of the corresponding PEVs 16A-16D on the map 22 of the terrain, as shown in FIG. 3. Optionally, as shown in FIG. 3, the RTS 12 may also display locations of stationary charging stations 23 on the map 22.

The RTS 12 may select positions of PEVs 16A-16D to be communicated to the communication devices 14A-14D by filtering the PEVs according to preselected criteria. Specifically, a criterion for filtering the PEVs may be defined as a location or destination of the PEV requesting a V2V charge. For example, if the user of a particular PEV, such as the first PEV 16A, defines the subject PEV's destination on the map 22, the RTS 12 may specifically select the service member PEVs along the route of the first PEV, or in the vicinity of the destination. An additional criterion for filtering the PEVs may be according to the type of service requested. For example, if the first PEV 16A needs to be charged from another PEV, the PEVs which communicated V2V charging service offers to the RTS 12 may be selected. On the other hand, if a particular PEV offers to discharge energy, RTS 12 may select the PEV(s) seeking to be charged. Also, filtering by the RTS 12 may be accomplished according to price and/or time constraints set either by the PEV requesting or offering the V2V charge.

Figure 4:
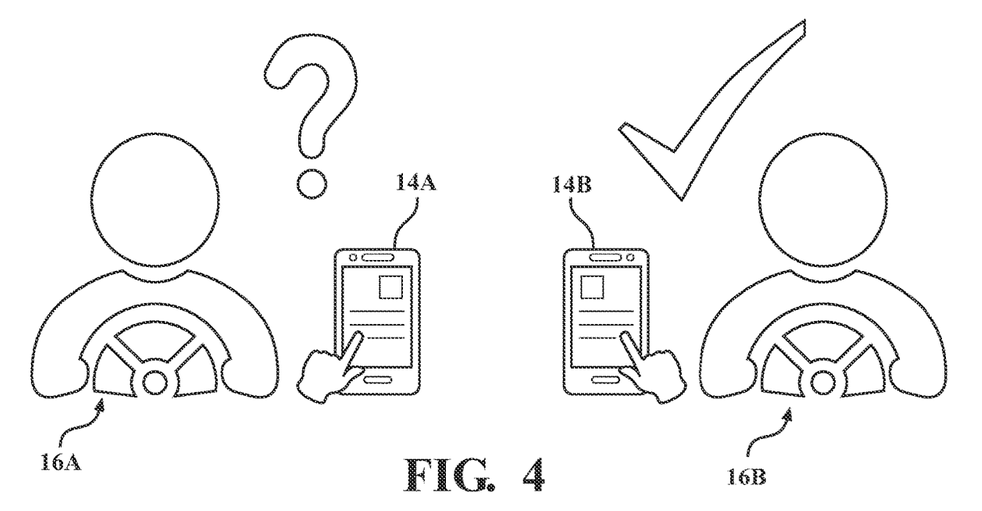
FIG. 4 is a schematic illustration of respective users of the first and second PEVs using corresponding first and second communication devices to communicate via the RTS.
Figure 5:
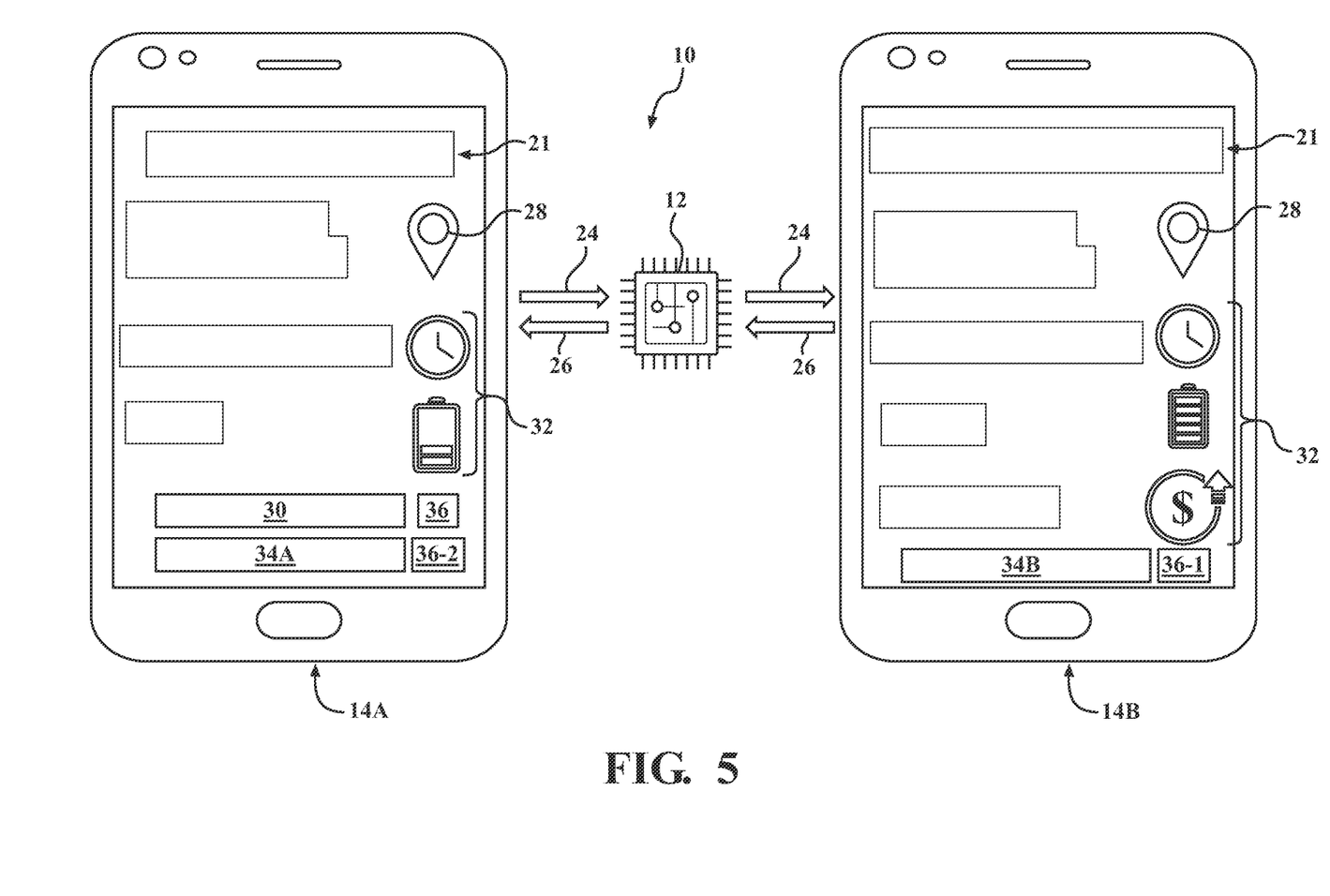
FIG. 5 is a schematic close-up view of the first and second communication devices shown in FIG. 4, depicting exchange of information therebetween using the RTS for arranging the V2V charging service.

With respect to the specific example of the first PEV 16A to be charged from the second PEV 16B (shown in FIG. 2), the users of the respective first and second PEVs 16A, 16B may be enabled to communicate via the communication devices 14A and 14B, as shown in FIG. 4. Specifically, as shown in FIG. 5, the first communication device 14A is configured to wirelessly transmit, via the RTS 12, to at least the second communication device 14B from among devices 14B-14D, a request 24 to charge the first PEV with a particular amount of electrical energy. As also shown in FIG. 5, upon receipt of the request 24, the second communication device 14B is configured to wirelessly transmit, via the RTS 12, to the first communication device 14A an offer 26 to dispense the requested amount of electrical energy from the second PEV 16B to the first PEV 16A. As part of the offer 26, the second communication device 14B may be further configured to wirelessly transmit, via the RTS 12, to the first communication device 14A a proposed location 28 on the map 22 to affect or implement the charging service. Alternatively, as part of the request 24, the first communication device 14A may be configured to wirelessly transmit, via the RTS 12, to the second communication device 14B the proposed location 28 on the map 22 to implement the charging service, in which case, the offer 26 may include acceptance of the proposed location.

With continued reference to FIG. 5, the first communication device 14A is further configured to wirelessly transmit, via the RTS 12, to the second communication device 14B an acceptance 30 of the offer 26 to dispense the requested amount of electrical energy and thereby implement the charging service. As part of the acceptance 30, the first communication device 14A may wirelessly transmit, via the RTS 12, to the second communication device 14B an acceptance of the proposed location 28 on the map 22 to implement the charging service. As additionally illustrated in FIG. 5, the RTS 12 may be further configured to wirelessly communicate to each of the first and second communication devices 14A, 14B charge parameters 32, such as a quantity of kW-hours, time to implement the charging service, price per kWh of the charging service, to implement the charging service. In such an embodiment, each of the first and second communication devices 14A, 14B may wirelessly transmit to each other, via the RTS 12, respective acceptances 34A, 34B of the charge parameters 32.

At least one of the first communication device 14A and the second communication device 14B may be configured to wirelessly transmit, via the RTS 12, an inquiry 36 to the other of the first and second communication devices, whether the respective first PEV 16A or second PEV 16B is in possession of the charging cable assembly 18 for electrically connecting and charging the first PEV from the second PEV. The RTS 12 may then facilitate communication of a response to the inquiry 36, such as an affirmation 36-1 or a denial 36-2 from either the first or the second communication device 14A, 14B that the charging cable assembly 18 is available to implement the charging service. Additionally, the RTS 12 may be configured to wirelessly enable the user of the first PEV 16A or the user of the second PEV 16B to commence the charging service, for example by opening a charging socket of the first and/or second PEV to connect the charging cable assembly 18. For example, the RTS 12 may communicate a pass code to either the user of the first PEV 16A or the user of the second PEV 16B to be entered by the subject PEV user via the corresponding communication device 14A or 14B, thereby granting access to the other PEV's charging socket.

The RTS 12 may be further configured to wirelessly enable the user of the first PEV 16A or the user of the second PEV 16B to terminate or complete the charging service, such as by communicating a termination code to either the first or second communication device 14A, 14B. The user of the first PEV 16A or the user of the second PEV 16B may thus prematurely abort the charging service. Additionally, the user of the first PEV 16A or the user of the second PEV 16B may terminate or complete the charging service remotely, via the respective corresponding communication device 14A or 14B, and/or physically disconnect the charging cable assembly 18 from the first and second PEVs. Furthermore, the RTS 12 may be configured to wirelessly communicate to each of the first and second communication devices 14A, 14B when the charging service has been completed. The RTS 12 may be additionally configured to enable the user of the first PEV 16A to transfer payment for the completed charging service to the user of the second PEV 16B via the first communication device 14A.

Figure 6:
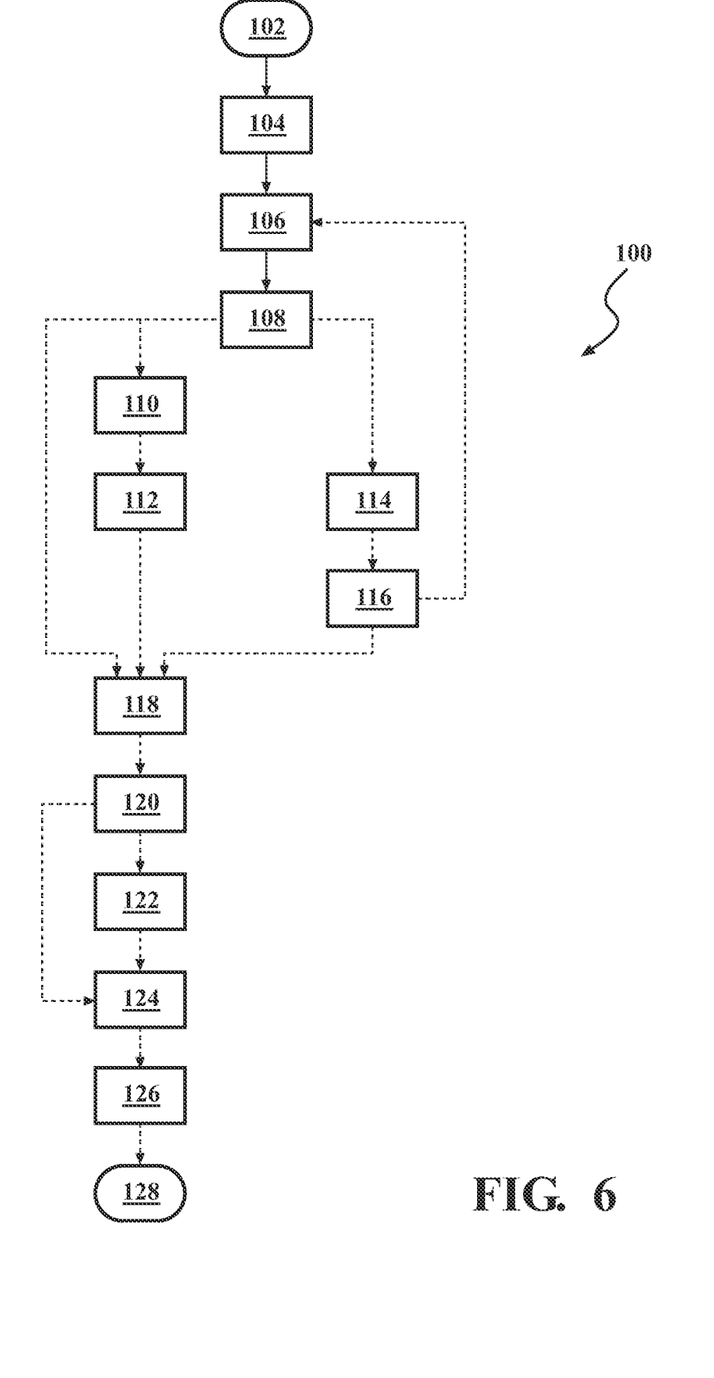
FIG. 6 is a flow diagram of a method configured to provide a V2V charging service using the RTS shown in FIGS. 1 and 3-5 for PEVs shown in FIG. 2, according to the present disclosure.

FIG. 6 depicts a method 100 of providing a V2V charging service for PEVs, such as the PEVs 16A-16D having membership in the service, which may attach either to the individual PEVs or to their owners/operators, via the system 10, as described above with respect to FIGS. 1-5. The method 100 uses the RTS 12 to facilitate communication between a PEV seeking to obtain an electrical charge from another PEV, such as the first PEV 16A from the second PEV 16B. The method 100 initiates in frame 102 with the RTS 12 determining real-time positions of each individual PEV 16A-16D relative to the terrain covered by the map 22. As part of frame 102, the method may include updating positions of the individual PEVs 16A-16D on the map 22. Following frame 102, the method proceeds to frame 104, where the method includes wirelessly communicating, via the RTS 12, with the communication devices 14A-14D, such as via the mobile application 21. In frame 104 the method includes providing to the communication devices 14A-14D real-time positions of each individual PEV 16A-16D on the map 22.

After frame 104, the method advances to frame 106. In frame 106 the method includes wirelessly transmitting, using the RTS 12, via the first communication device 14A to one or more of the communication devices 14B-14D the request 24 for an amount of electrical energy to charge the first PEV 16A. In frame 106, as part of the request 24, the method may also include wirelessly transmitting, using the RTS 12, via the first communication device 14A to the second communication device 14B the proposed location 28 on the map 22 to implement the charging service. Following frame 106, the method proceeds to frame 108. In frame 108 the method includes wirelessly transmitting, using the RTS 12, via the second communication device 14B to the first communication device 14A the offer 26 to dispense the requested amount of electrical energy from the second PEV 16B to the first PEV 16A. Additionally, if the location 28 has not been proposed by first communication device 14A, in frame 108 the method may include wirelessly transmitting the proposed location to the first communication device 14A via the second communication device 14B. Alternatively, in frame 108, if the request 24 did include the proposed location 28, the offer 26 may include acceptance of the proposed location to implement the charging service.

Following frame 108, the method may proceed to frame 110 or to frame 114. In frame 110 the method includes wirelessly communicating, via the RTS 12, to each of the first and second communication devices 14A, 14B charge parameters 32 to implement the charging service. After frame 110, the method may advance to frame 112 for wirelessly transmitting via each of the first and second communication devices 14A, 14B to each other respective acceptances 34A, 34B of the charge parameters 32. Following frame 112, the method may proceed to frame 114. In frame 114 the method includes wirelessly transmitting via the first and/or second communication devices 14A, 14B, using the RTS 12, the inquiry to the other of the two communication devices, whether the respective first PEV 16A or the second PEV 16B is in possession of the charging cable assembly 18. After frame 114, the method may advance to frame 116 for gathering the affirmative response from either the first or the second communication device 14A, 14B that the charging cable assembly 18 is available to implement the charging service.

If in frame 116 it is determined that neither the first nor the second user of the PEVs 16A and 16B have access to the charging cable assembly 18, the method may loop back to frame 106 for wirelessly transmitting via the first communication device 14A to one or more of the remaining communication devices, such as devices 14C-14D, another request 24 for an amount of electrical energy to charge the first PEV 16A. Alternatively, following frame 108, 112, or 116, the method moves on to frame 118. In frame 118, the method includes wirelessly transmitting, using the RTS 12, via the first communication device 14A to the second communication device 14B, acceptance 30 of the offer to dispense the requested amount of electrical energy and thereby implementing the charging service. Following frame 118, the method may proceed to frame 120. In frame 120 the method includes wirelessly enabling, via the RTS 12, the user of the first PEV 16A or the user of the second PEV 16B to commence the charging service, such as by opening the charging socket of the second PEV and connecting the charging cable assembly 18 to the second PEV.

After frame 120, the method may advance to frame 122 or to frame 124. In frame 122, the method includes wirelessly enabling, via the RTS 12, the user of the first PEV 16A or the user of the second PEV 16B to terminate the charging service as described with respect to FIGS. 1-5 above. In frame 124 the method includes wirelessly communicating, via the RTS 12, to each of the first and second communication devices 14A, 14B when the charging service has been completed, whether according to the accepted offer 26 or if the charging has been terminated prematurely. After frame 124, the method may advance to frame 126. In frame 126, the method includes wirelessly enabling, via the RTS 12, the user of the first PEV 16A to transfer payment for the charging service, such as via the first communication device 14A, to the user of the second PEV 16B. The method 100 may conclude in frame 128 once the charging service has been completed, the first and second PEVs 16A, 16B have been electrically disconnected, and the payment for the charging service has been transferred.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for a vehicle-to-vehicle (V2V) charging service for plug-in electric vehicles (PEVs), the system comprising:
    a real-time server (RTS) configured to wirelessly communicate with a plurality of communication devices associated with individual PEVs having membership in the V2V charging service and provide to the plurality of communication devices real-time positions of at least some of the individual PEVs on a map of a terrain;
    a first communication device associated with a first PEV from the individual PEVs and configured to wirelessly transmit, via the RTS, to at least one of the communication devices associated with the remaining individual PEVs, a request for an amount of electrical energy to charge the first PEV; and
    a second communication device associated with a second PEV from the individual PEVs and configured to wirelessly transmit, via the RTS, to the first communication device an offer to dispense from the second PEV to the first PEV the amount of electrical energy requested by the first communication device;
    wherein:
        the first communication device is further configured to wirelessly transmit, via the RTS, to the second communication device an acceptance of the offer to dispense the requested amount of electrical energy and thereby implement the charging service; and
        at least one of the first communication device and the second communication device is further configured to wirelessly transmit, via the RTS, an inquiry to the other of the first communication device and the second communication device, whether the respective first PEV or second PEV is in possession of a charging cable assembly for electrically connecting the first PEV to the second PEV to charge the first PEV from the second PEV.

2. The system of claim 1, wherein the second communication device is further configured to wirelessly transmit, via the RTS, to the first communication device a proposed location on the map to implement the charging service.

3. The system of claim 2, wherein the first communication device is further configured to wirelessly transmit, via the RTS, to the second communication device an acceptance of the proposed location on the map to implement the charging service.

4. The system of claim 1, wherein the RTS is further configured to wirelessly communicate to each of the first and second communication devices charge parameters to implement the charging service; and
    wherein each of the first and second communication devices wirelessly transmit to each other, via the RTS, a respective acceptance of the charge parameters.

5. The system of claim 1, wherein the RTS is further configured to wirelessly enable a user of the first PEV or a user of the second PEV to commence the charging service.

6. The system of claim 1, wherein the RTS is further configured to wirelessly enable a user of the first PEV or a user of the second PEV to terminate the charging service.

7. The system of claim 1, wherein the RTS is further configured to wirelessly communicate to each of the first and second communication devices when the charging service has been completed.

8. The system of claim 1, wherein the RTS is further configured to enable a user of the first PEV to transfer payment for the charging service to a user of the second PEV.

9. The system of claim 1, wherein the RTS is further configured to update positions of each individual PEV on the map of the terrain.

10. A method of providing a vehicle-to-vehicle (V2V) charging service for plug-in electric vehicles (PEVs), the method comprising:
   wirelessly communicating, via a real-time server (RTS), with a plurality of communication devices associated with individual PEVs having membership in the service, including providing to the plurality of communication devices real-time positions of at least some of the individual PEV on a map of a terrain;
   wirelessly transmitting, using the RTS, via a first communication device associated with a first PEV from the individual PEVs, to at least one of the communication devices associated with the remaining individual PEVs, a request for an amount of electrical energy to charge the first PEV;
   wirelessly transmitting, using the RTS, via a second communication device associated with a second PEV from the individual PEVs, to the first communication device an offer to dispense from the second PEV to the first PEV the amount of electrical energy requested by the first communication device;
   wirelessly transmitting via at least one of the first communication device and the second communication device, using the RTS, an inquiry to the other of the first communication device and the second communication device, whether the respective first PEV or the second PEV is in possession of a charging cable assembly for electrically connecting the first PEV to the second PEV to charge the first PEV from the second PEV; and
   wirelessly transmitting, using the RTS, via the first communication device to the second communication device, acceptance of the offer to dispense the requested amount of electrical energy and thereby implementing the charging service.

11. The method of claim 10, further comprising wirelessly transmitting, using the RTS, to the first communication device via the second communication device, a proposed location on the map to implement the charging service.

12. The method of claim 11, further comprising wirelessly transmitting, using the RTS, to the second communication device via the first communication device, acceptance of the proposed location on the map to implement the charging service.

13. The method of claim 10, further comprising:
   wirelessly communicating, via the RTS, to each of the first and second communication devices charge parameters to implement the charging service; and
   wirelessly transmitting, using the RTS, via each of the first and second communication devices to each other a respective acceptance of the charge parameters.

14. The method of claim 10, further comprising wirelessly enabling, via the RTS, a user of the first PEV or the user of a second PEV to commence the charging service.

15. The method of claim 10, further comprising wirelessly enabling, via the RTS, a user of the second PEV to terminate the charging service.

16. The method of claim 10, further comprising wirelessly communicating, via the RTS, to each of the first and second communication devices when the charging service has been completed.

17. The method of claim 10, further comprising wirelessly enabling, via the RTS, a user of the first PEV to transfer payment for the charging service to a user of the second PEV.

18. The method of claim 10, further comprising updating positions of each individual PEV on the map of the terrain.

19. The system of claim 1, wherein the first communication device is configured to wirelessly transmit acceptance of the offer after it is determined that at least one of the first PEV and the second PEV is in possession of the charging cable assembly.

20. The method of claim 10, wherein acceptance of the offer to dispense the requested amount of electrical energy is transmitted after it is determined that at least one of the first PEV and the second PEV is in possession of the charging cable assembly.

* * * * *